United States Patent [19]

Curbelo

[11] Patent Number: 5,671,047
[45] Date of Patent: Sep. 23, 1997

[54] LASER BEAMSPLITTER FOR GENERATING A PLURALITY OF PARALLEL BEAMS

[75] Inventor: Raul Curbelo, Lexington, Mass.

[73] Assignee: Bio-Rad Laboratories, Cambridge, Mass.

[21] Appl. No.: 441,126

[22] Filed: May 15, 1995

[51] Int. Cl.$^6$ .................................................. G01B 9/02
[52] U.S. Cl. ........................................ 356/346; 356/358
[58] Field of Search ........................... 356/345, 346, 356/358; 359/636, 638, 639, 640

[56] References Cited

U.S. PATENT DOCUMENTS

| | | | |
|---|---|---|---|
| 3,743,378 | 7/1973 | Bousky | 359/636 |
| 4,053,231 | 10/1977 | Fletcher et al. | 356/346 |
| 4,779,983 | 10/1988 | Learner et al. | 356/346 |
| 4,797,696 | 1/1989 | Allen et al. | 359/636 |

FOREIGN PATENT DOCUMENTS 706806  4/1954  United Kingdom .

Primary Examiner—David C. Nelms
Assistant Examiner—Robert Kim
Attorney, Agent, or Firm—Lyon & Lyon LLP

[57] ABSTRACT

A laser beamsplitter for generating a plurality of parallel beams comprises a first beamsplitter and a second beamsplitter. The first and second beamsplitters are manufactured from glass flats having precisely parallel faces, wherein the front surface is coated with a reflective coating and the back surface is coated with a beamsplitter coating such that an initial laser beam passing through the first beamsplitter at a preferred angle of incidence is split into a first beam and a second beam. The second beamsplitter is positioned relative to the first beamsplitter such that the first beam passes through the second beamsplitter and is split into a third beam and a fourth beam. The parallelism of the output beams are determined by the parallelism of the glass flats, and no manual adjustments need to be made. The second, third, and fourth beams, if shone onto a surface orthogonal to the path of the initial beam, display three points that define a triangle, and preferably an equilateral triangle. The coatings on the surfaces of the first and second beamsplitters are chosen to provide three output beams having substantially the same intensity.

51 Claims, 4 Drawing Sheets

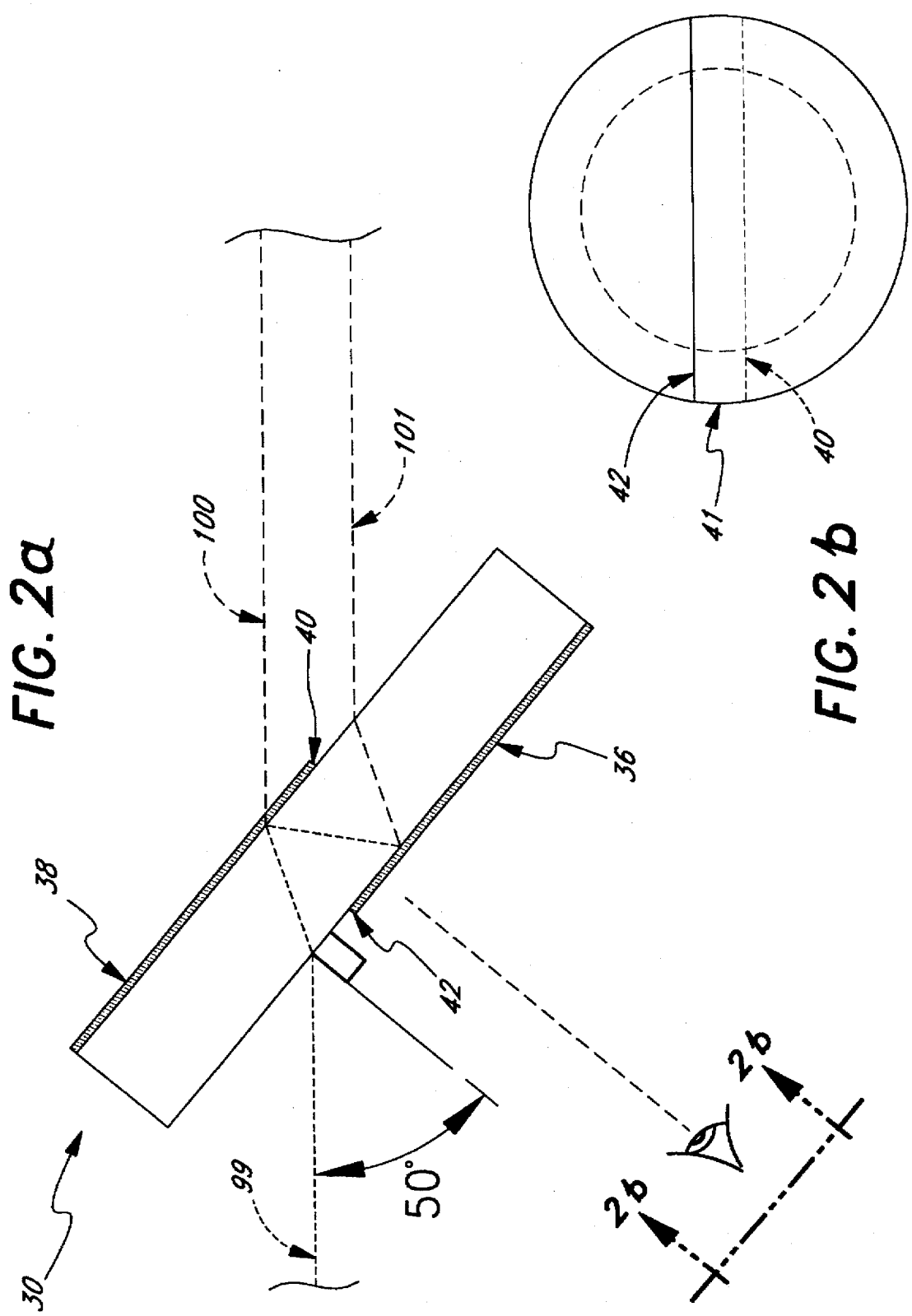

LASER BEAMSPLITTER FOR GENERATING A PLURALITY OF PARALLEL BEAMS

FIELD OF THE INVENTION

This invention relates to a laser beamsplitter for generating a plurality of parallel beams, and more specifically to a laser beamsplitter for generating a plurality of parallel beams for use in an interferometer, spectrometer, or any other device that requires, or benefits from, a parallel source of radiation.

BACKGROUND OF THE INVENTION

A typical Fourier transform spectrometer includes a Michelson interferometer comprising a fixed mirror, a movable mirror, and a primary beamsplitter. An infrared beam (to be analyzed) and a monochromatic beam (to provide a position reference) are directed into the interferometer. Both the infrared input beam and the monochromatic input beam are split by the primary beamsplitter, with one portion of each beam traveling a path that causes the beams to reflect from the fixed mirror, and the other portion of each beam traveling a path that causes the beams to reflect from the movable mirror.

The movement of the movable mirror toward and away from the primary beamsplitter results in the scanning of constructively and destructively interfering wavelengths, since the relative position of the movable mirror with respect to the primary beamsplitter and fixed mirror determines which wavelengths constructively and destructively interfere with each other when the beams reflected from the two mirrors are recombined at the primary beamsplitter. The recombined infrared and monochromatic beams are then directed to a detection system comprising detectors.

As a result of the optical interference between the two split portions of each beam, the intensity of the monochromatic beam is modulated at a frequency proportional to its optical frequency and the velocity of the movable mirror, while each frequency component of the infrared beam is modulated at a frequency proportional to that component's optical frequency and the velocity of the movable mirror. The detector produces an output representing the superposition of these components and, when sampled at regular distance intervals, the detector provides an interferogram whose Fourier transform yields a desired spectrum.

It is critical in the design of such spectrometers that the surfaces of the fixed mirror and the movable mirror be held in positions such that the beamsplitter is in a plane parallel to the bisectrix of the angle between the fixed and moving mirrors. Mirror position accuracy is crucial because deviations in the mirror alignment produce small errors in the time domain interferogram which may translate into large errors in the frequency domain spectrum. In a typical interferometer, mirror angular deviations larger than $1/10$ of a wavelength across the beam of the received radiation beam are considered significant and can seriously degrade the quality of the spectrometer.

It is known in the prior art that a sensing mechanism can be provided that continuously senses the state of alignment of a scanning Michelson interferometer such that error signals proportional to small tilts along two linearly independent axes are generated. The error signals are amplified and applied to displacement transducers mounted on either the stationary or movable mirror such that the detected tilt errors may be eliminated by means of a closed loop servo control. In this manner, an interferometer with a modestly precise mechanical mirror movement guide may be used for spectroscopy requiring precisely parallel and wide range mirror displacements.

The alignment sensing is implemented by using a continuously operating laser which produces an essentially monochromatic beam of radiation. The intensity variation of this radiation at the output of the interferometer is essentially sinusoidal as a function of mirror displacement, undergoing one full cycle for a mirror displacement equal to one half the laser wavelength.

A typical Fourier transform spectrometer is described in U.S. Pat. No. 4,345,838 issued to Buijs et al, and is incorporated herein by reference. Therefore, since the operation of a typical Fourier transform spectrometer is known in the art, a detailed description is not provided herein. The Buijs '838 patent explains the typical operation of such a spectrometer, stating that it "has been customary to use a generally square-shaped laser reference beam." As described in the Buijs '838 patent, a typical interferometer is set up whereby the reference laser beam is supplied to the spectrometer. Three detectors arranged at the vertices of a right-angled triangle detect interferograms corresponding to three points in the optical beam, and the phase difference between these interferograms provide error signals to a mirror control system.

The improvements in the Buijs '838 patent consist of orienting the beamsplitter with respect to the reference beam so that ghost images are displaced along a diagonal of the square-shaped beam, and masking the square-shaped reference beam with an L-shaped opening such that spurious signals are eliminated. Such improvements are not relevant to the present invention.

One of the main problems that exist with the customarily used expanded laser reference beam in a typical Fourier transform spectrometer is the tight requirements that are necessary in order to produce a well-collimated beam. Furthermore, expanding a laser reference beam into an expanded cross section beam requires the use of multiple lenses that require alignment with respect to the laser. These multiple lenses add to the overall cost of such a system. Moreover, these lenses require very precise adjustments.

To achieve proper expansion of the beam, even with the use of multiple lenses, a test distance of at least ten meters is required between the laser beam source and test screen. With shorter test distances, it becomes harder to measure the beam divergence.

The three detectors being used in a typical spectrometer are set up to detect three discrete regions of a single expanded beam. Three detectors are used since three points are necessary to define a plane. Therefore, by having the detectors monitoring three distinct sections of the single expanded beam, the system can calculate if there are any differences in retardation between points 1 and 2, or points 2 and 3, or points 1 and 3. If there are differences, then it is an indication that the interferometer mirrors are not perfectly aligned. In other words, if the signal from any one of the three beam sections are out of phase with any of the signals from the other two beam sections, then that indicates that that particular section of the beam had to travel a different distance than the other section, thereby indicating that the interferometer is not perfectly aligned in that direction.

Since it is very difficult to precisely collimate an expanded beam, it is possible that synchronization differences between the three sections of the single expanded beam may be due to poor collimation, rather than an improperly aligned mirror. An expanding beam diverges, and is difficult to maintain the rays precisely parallel to each other.

Furthermore, expansion of the single beam results in a loss of light intensity available for the detector, which reduces the available signal-to-noise ratio available in the detector. For maximum efficiency, it is desirable to have the maximum amount of light reaching the detectors.

Therefore, a better solution is needed for providing a reference laser beam for use in devices benefitting from a precisely parallel radiation source, such as a detection system useful for maintaining mirror alignment in a typical Fourier transform spectrometer.

SUMMARY OF THE INVENTION

A laser beamsplitter of the present invention for generating a plurality of parallel beams provides parallel laser beams for use in devices benefitting from a precisely parallel radiation source, such as a detection system useful for maintaining mirror alignment in a typical Fourier transform spectrometer.

In a preferred embodiment, the laser beamsplitter of the present invention is used in conjunction with a laser reference source in a spectrometer for generating three parallel laser beams with a divergence preferably less than or equal to $3 \times 10^{-4}$ rads. The laser beamsplitter of the present invention, in conjunction with the laser reference source, generates three parallel beams that are configured in a triangular orientation with respect to each other by using a first and a second beamsplitter. The parallelism of these output beams only depends on the parallelism of the faces of glass plates used in the first and second beamsplitter. Producing parallel faces of glass plates are easily and economically achieved using current manufacturing processes, and therefore, provide benefits over the prior art in that they do not require any optical alignment. An initial laser beam from the laser reference source is passed through the first beamsplitter and is split into two beams. One of these beams is then passed through the second beamsplitter and is again split into two beams.

In a preferred embodiment, the first beamsplitter comprises a circular piece of glass, and the second beamsplitter comprises a rectangular piece of glass. Since alignment of the initial beam and the first beamsplitter does not require the same precision as is necessary between the second beamsplitter and the split beams which exit from the first beamsplitter, an easier-to-manufacture circular piece of glass is used for the first beamsplitter and a more-precise-but-harder-to-manufacture rectangular piece of glass is used for the second beamsplitter. The second beamsplitter must be positioned such that one of the split beams from the first beamsplitter does not pass through it, whereas the other split beam must pass through it and be split again. Thus, with the straight edge of the rectangular shape, it will be easier to align the second beamsplitter so that only one beam is passed through it.

On the first beamsplitter, the back of the glass is coated from the top down to a horizontal line past the mid-point. The front of the glass is coated from the bottom up to a horizontal line past the mid-point. Thus, the front coating and back coating overlap such that a beam with an incident angle of zero degrees could not pass through the glass without passing through at least one of the coatings. The initial beam is directed into the upper uncoated front portion of the glass above the mid-point at a preferred incidental angle of fifty (50) degrees. The initial beam then travels through the glass and hits the upper coated back portion of the glass above the midpoint. This coating is a beamsplitting coating in that some of the beam travels through, and some of the beam is reflected. A portion of the beam passes through this back coating (forming beam 0), while another portion of the beam is reflected back through the glass downward, wherein the beam reflects off of the lower coated front portion of the glass. The lower coating is preferably a purely reflective coating in that no portion of the beam travels through. The beam reflects off of the front coating, and passes back through the glass and exits through the lower uncoated portion of the back side of the glass (forming beam 1). In a preferred embodiment, the first beamsplitter is tilted forward in a vertical plane about a horizontal axis such that the initial beam has an incident angle to the upper uncoated portion of the glass of fifty (50) degrees.

On the second beamsplitter, the back of the glass is coated from the left across to a vertical line past the mid-point with a beamsplitter coating. The front of the glass is coated from the right across to a vertical line past the mid-point with a purely reflective coating. Thus, the front coating and back coating overlap such that a beam with an incident angle of zero degrees could not pass through the glass without passing through at least one of the coatings. The second beamsplitter is positioned such that beam 1 is directed below the second beamsplitter. Beam 0 is directed into the left uncoated front portion of the glass to the left of the mid-point at a preferred incidental angle of fifty (50) degrees. Beam 0 then travels through the glass and hits the left coated back portion of the glass to the left of the midpoint. A portion of the beam passes through this back coating (forming beam 2), while another portion of the beam is reflected back through the glass rightward, wherein the beam reflects off of the right coated front portion of the glass. The beam then reflects off of the front coating, and passes back through the glass and exits through the right uncoated portion of the back side of the glass (forming beam 3).

It is understood that the coatings can be applied either up and down or left and right, since rotation of the beamsplitter ninety (90) degrees results in a similar orientation of the coatings.

Therefore, since the initial beam is split into beam 0 and beam 1, and beam 0 is split into beam 2 and beam 3, the resulting output beams from the initial input beam are beams 1, 2, and 3. In a preferred embodiment, if an imaginary line were drawn perpendicularly connecting beams 0 and 1, and an imaginary line were drawn perpendicularly connecting beams 2 and 3, these two lines would be perpendicular to each other, since the first and second beamsplitter are, in effect, rotated 90° off of each other with regard to the splitting of the beams up and down or left and right. Thus, the laser beamsplitter of the present invention generates three parallel beams that are oriented in a triangular configuration relative to each other. In other words, if the three beams were shone onto a surface orthogonal to the path of the laser beams, the three beams would appear as three points that, in a preferred embodiment, define an equilateral triangle. In order to space the three beams into an equilateral triangle configuration, the second beamsplitter must separate beams 2 and 3 slightly further apart than the first beamsplitter separates beams 0 and 1. The relative amount of separation can be controlled by controlling the thickness of the first and second beamsplitters. In addition, if the first and second beamsplitters are positioned such that the output beams 1, 2, and 3 are oriented in a triangle configuration relative to each other, then variations between two points of the triangle defining a vertical line indicate that the mirror is out of alignment tilted around a horizontal axis, whereas variations between two points of the triangle defining another line indicate that the mirror is out of alignment tilted around an axis perpendicular to the line between the two points being considered.

For simplicity and clarity of description, the positioning of the first beamsplitter shall be referred to as being in a vertical position such that beams 0 and 1 are split into an upper and lower beam, and the positioning of the second beamsplitter shall be referred to as being in a horizontal position such that beams 1 and 2 are split into a left and a right beam.

Unlike the prior art where multiple lenses are required to expand the laser beam so that three separate sections of a single beam can be monitored by detectors, the laser beamsplitter of the present invention generates three discrete, individual, and precisely parallel beams for individual monitoring though the use of the first and second beamsplitter. Using glass manufactured with two precisely parallel faces is less expensive and easier to control than the prior art implementations that make use of multiple lenses. Thus, an interferometer utilizing the laser beamsplitter of the present invention eliminates the costs associated with utilizing multiple lenses for expanded beams. The multiple lenses, and the necessary adjustment mechanisms, typically cost more than the first and second beamsplitter used in the preferred embodiment of the present invention. Moreover, the first and second beamsplitters generate parallel beams, without the need for constant adjustments, since the parallelism of the beams is determined by the parallelism of the optical flats, or opposing faces, of the beamsplitter. Obtaining precisely parallel optical flats is less expensive than obtaining the necessary adjustment mechanisms required for the prior art multiple lens embodiments. Furthermore, the laser beamsplitter of the present invention generates beams that are more precisely parallel to each other than the prior art expanded cross section laser reference beam, thereby providing more accurate alignment of the mirrors, and all of the beams' intensity is used by the detectors for more efficient operation of the interferometer.

Accordingly, it is an object of the present invention to provide a laser beamsplitter for generating a plurality of parallel beams.

It is a further object of the present invention to provide a laser beamsplitter for generating a plurality of parallel beams for use in an interferometer, spectrometer, or any other device that requires, or benefits from, a parallel source of radiation.

An additional object of the present invention is to provide three parallel laser beams for use in devices benefitting from a precisely parallel radiation source, such as a detection system useful for maintaining mirror alignment in a typical Fourier transform spectrometer.

Yet another object of the present invention is to provide output beams that have substantially the same intensity by selecting coatings on the front and back of the first and second beamsplitters such that, at their nominal implementations, the output beams will have substantially the same intensity.

Another object of the present invention is to provide a way of generating a plurality of parallel beams that is less expensive than using multiple lenses, and does not require the manual alignment necessary in the multiple lens embodiments of the prior art.

Further objects and advantages of the present invention will become apparent from a consideration of the drawings and ensuing description.

BRIEF DESCRIPTION OF THE DRAWINGS

FIG. 2a is a side cutaway view of a first beamsplitter oriented in a vertical position splitting an initial beam from the laser reference source into an upper beam and a lower beam.

FIG. 2b is a front view of the first beamsplitter.

DETAILED DESCRIPTION OF A PREFERRED EMBODIMENT

Figure 1:
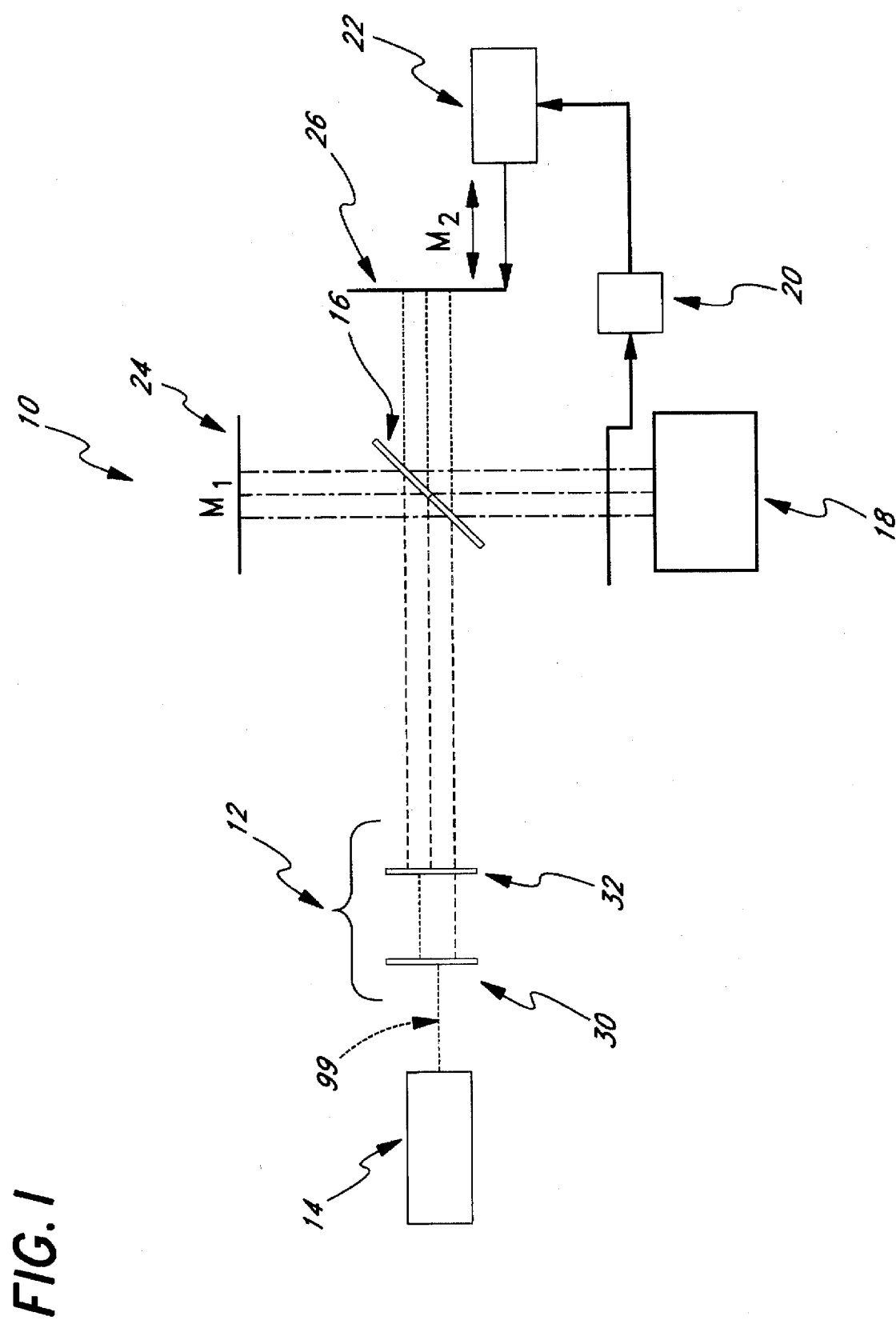
FIG. 1 is a block diagram showing the basic elements of a Fourier transform spectrometer utilizing a laser beamsplitter of the present invention.

FIG. 1 shows the basic elements of a typical Fourier transform spectrometer 10 incorporating features of the present invention. The spectrometer 10 includes an interferometer comprising a laser beamsplitter 12 of the present invention in conjunction with a laser reference source 14, a primary beamsplitter 16, a detector 18, a signal generator 20, a transducer 22, a fixed mirror 24, and a movable mirror 26. It is noted that instead of a device for providing a customary generally expanded cross section laser reference beam (not shown), the laser reference source 14 in conjunction with the laser beamsplitter 12 of the present invention for generating a plurality of parallel beams is shown in its place. Operation of the typical Fourier transform spectrometer 10 is only relevant to the present invention in that the spectrometer 10 is an example of an application that can benefit from the laser beamsplitter 12 of the present invention. Operation of the typical Fourier transform spectrometer 10 with a generally expanded laser reference beam (not shown) is discussed in the Buijs '838 patent, and is known in the art. Therefore, operation of the spectrometer 10 is not discussed in further detail. The remaining discussion focuses on the structure and operation of the laser beamsplitter 12.

The laser beamsplitter 12 of the present invention comprises a first beamsplitter 30 and a second beamsplitter 32 oriented in a predetermined position relative to the laser reference source 14. The laser reference source 14 generates an initial beam 99.

In FIG. 2a, the first beamsplitter 30 is shown from a side cutaway view. The first beamsplitter 30 comprises a circular piece of glass 34, a first front coating 36, and a first back coating 38. The circular piece of glass 34 is sometimes referred to as an optical flat with parallel faces. The first front coating 36 is a purely reflective coating in that none of the beam travels through the coating. The first back coating 38 is a beamsplitting coating in that part of the beam travels through the coating and part of the beam is reflected. The backside of the circular glass 34 facing away from the laser reference source 14 is coated with the first back coating 38 from the top down to a first horizontal line 40 past a first midpoint 41 (as shown in FIG. 2b). The front side of the circular glass 34 facing towards the laser reference source 14 is coated with the first front coating 36 from the bottom up to a second horizontal line 42 past the first midpoint 41 (as shown in FIG. 2b). Thus, the first front coating 36 and first back coating 38 overlap such that a beam with an incident angle of zero degrees could not pass through the circular glass 34 without passing through at least one of the coatings 36 or 38. An initial beam 99 is directed into the upper uncoated front portion of the circular glass 34 of the front beamsplitter 30 above the first midpoint 41 at a preferred incidental angle of fifty (50) degrees. The initial beam 99 then travels through the circular glass 34 and hits the upper portion of the first back coating 38 above the first midpoint 41. A portion of the initial beam 99 passes through the first back coating 38 as an upper beam 100, while another portion of the initial beam 99 is reflected back through the circular glass 34 downward, wherein the reflected beam reflects off of the lower portion of the first front coating 36, and passes back through the circular glass 34 and exits through the lower uncoated portion of the back side of the circular glass 34 as a lower beam 101.

In a preferred embodiment, the first beamsplitter 30 is tilted forward about a horizontal axis such that the initial beam 99 has an incident angle to the upper uncoated portion of the circular glass 34 of fifty (50) degrees. The fifty (50) degree angle is chosen so that for a preferred specified refractive index of glass, the two output beams are equidistant from the path of the input beam, assuming that the path of the input beam were extended through the beamsplitter unchanged.

Figures 3A, 3B:
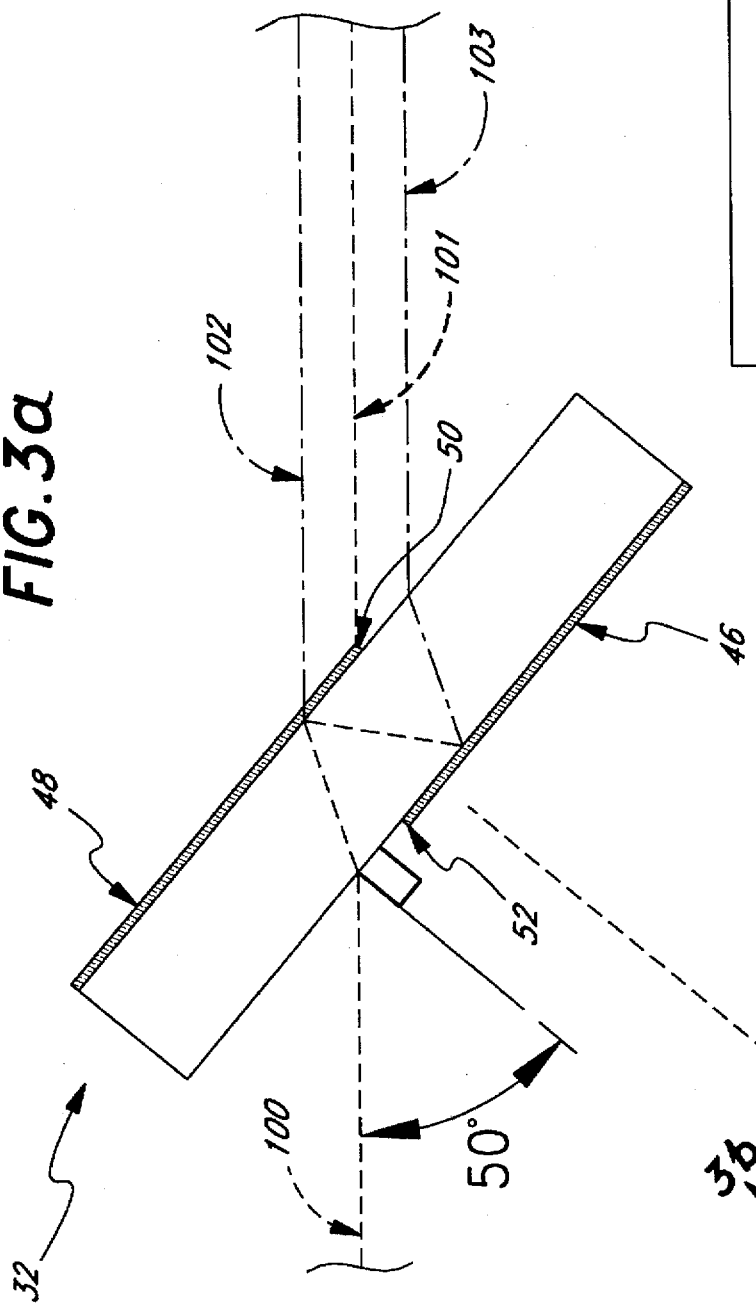
FIG. 3a is a top cutaway view of a second beamsplitter splitting the upper beam into a left beam and a right beam with the lower beam passing beneath the second beamsplitter.
FIG. 3b is a front view of the second beamsplitter.

In FIG. 3a, the second beamsplitter 32 is shown from a top cutaway view. The second beamsplitter 32 comprises a rectangular piece of glass 44, a second front coating 46, and a second back coating 48. The rectangular piece of glass 44 is sometimes referred to as an optical flat with parallel faces. The second front coating 46 is a purely reflective coating in that none of the beam travels through the coating. The second back coating 48 is a beamsplitting coating in that part of the beam travels through the coating and part of the beam is reflected. The backside of the rectangular glass 44 facing away from the laser reference source 14 is coated with the second back coating 48 from the left across to a first vertical line 50 past a second midpoint 51 (as shown in FIG. 3b). The front side of the rectangular glass 44 facing towards the laser reference source 14 is coated with the second front coating 46 from the right across to a second vertical line 52 past the second midpoint 51 (as shown in FIG. 3b). Thus, the second front coating 46 and second back coating 48 overlap such that a beam with an incident angle of zero degrees could not pass through the rectangular glass 44 without passing through at least one of the coatings 46 or 48. The second beamsplitter 32 is positioned such that the lower beam 101 passes underneath the second beamsplitter 32. The upper beam 100 is directed into the left uncoated front portion of the rectangular glass 44 of the second beamsplitter 32 to the left of the second midpoint 51 at a preferred incidental angle of fifty (50) degrees. The upper beam 100 then travels through the rectangular glass 44 and hits the left portion of the second back coating 48 to the left of the second midpoint 51. A portion of the upper beam 100 passes through the second back coating 48 as left beam 102, while another portion of beam 100 is reflected back through the glass 34 rightward, wherein the reflected beam reflects off of the right portion of the second front coating 46, and passes back through the rectangular glass 44 and exits through the right uncoated portion of the back side of the rectangular glass 44 as right beam 103. In a preferred embodiment, the second beamsplitter 32 is tilted about a vertical axis with the left side closer to the first beamsplitter 30 such that the upper beam 100 has an incident angle to the left uncoated portion of the rectangular glass 44 of fifty (50) degrees.

Figures 4, 5:
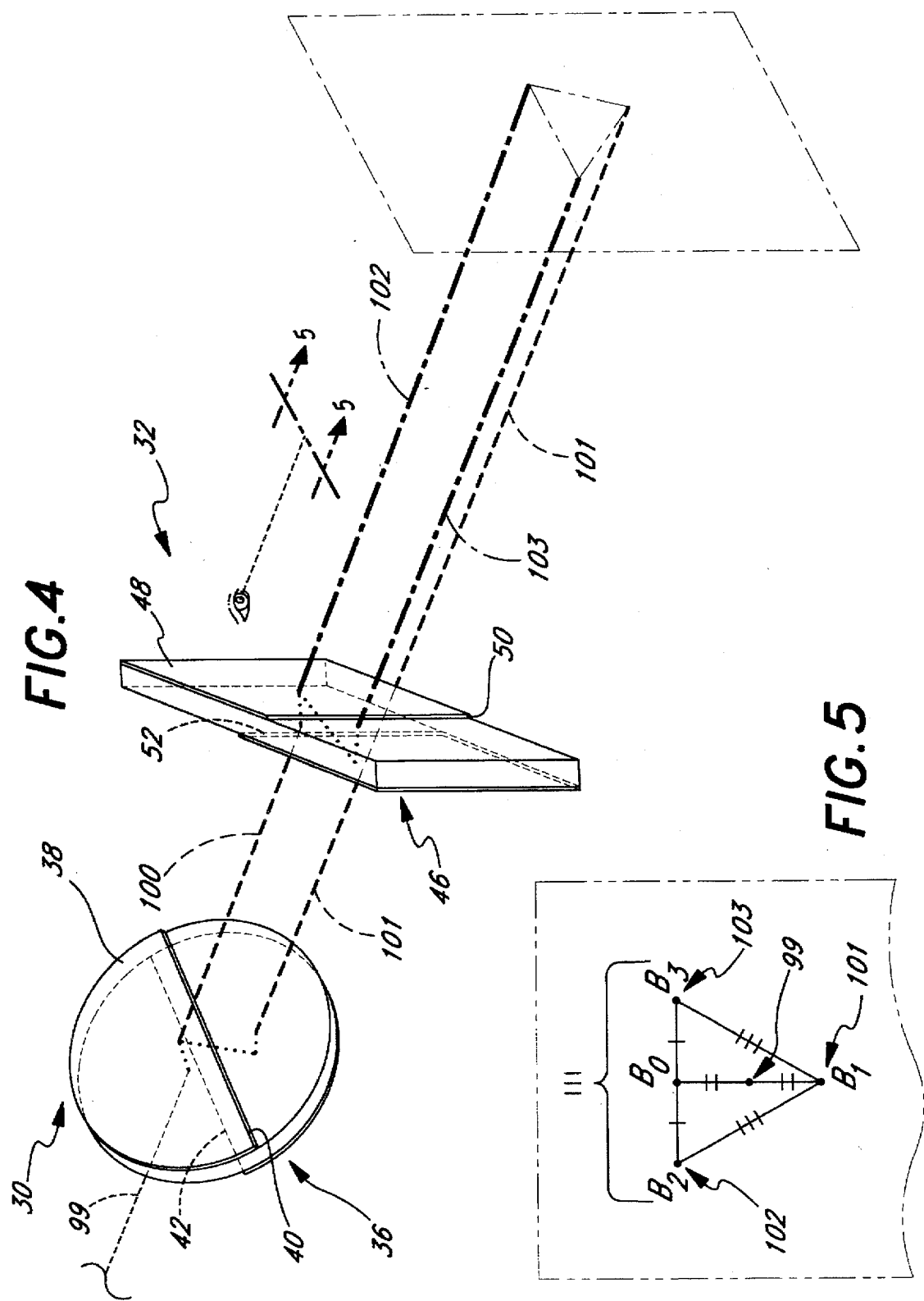
FIG. 4 is a perspective view of the first and second beamsplitter splitting the initial beam into three output beams.
FIG. 5 is an illustration of the relative position of each of the beams if, assuming that the initial beam and the upper beam are extended along their original path through the beamsplitters unaltered, the beams are shone onto a plane orthogonal to the beams. The position of each of the beams relative to each other creates a triangular configuration defined by the left, right, and lower beams, with the original path of the initial beam placing it approximately in the center of the formed triangle.

If an imaginary line were drawn perpendicularly to and connecting upper beam 100 and lower beam 101, and an imaginary line were drawn perpendicularly to and connecting left beam 102 and right beam 103, these two lines would be perpendicular to each other, since, in a preferred embodiment, the first and second beamsplitter 30 and 32 are oriented such that beams 100 and 101 are split upwards and downwards, whereas beams 102 and 103 are split left and right (as shown in FIG. 4). Thus, the laser beamsplitter 12 of the present invention generates three beams 101, 102, and 103, that are parallel to each other, and if shone onto a surface orthogonal to the path of the initial beam 99, the three beams 101, 102, and 103 would appear as three points that, in a preferred embodiment, define an equilateral triangle (as shown in FIG. 5). In order to create spacing between the beams such that they form an equilateral triangle, beams 102 and 103 must be split slightly further apart than beams 100 and 101. This can be accomplished with a different thickness for the first and second beamsplitter 30 and 32.

In a preferred embodiment, the first and second beamsplitter 30 and 32 are manufactured according to the following specifications. A preferred glass material for manufacturing the first and second beamsplitter 30 and 32 is BK7 optical crown glass or other glass with N=1.45/1.55 at 632.8 nm (refractive index of the glass to be between 1.45 and 1.55 at the wavelength of 633 nanometers) having a clear aperture of 20 mm minimum, centered, defining the area where the specification for the surface applies. The front and back surfaces of the first and second beamsplitter 30 and 32 having a flatness better than 1 wave at 6328 Angstroms, both sides. This refers to the maximum deviation from an ideal plane measured in wavelength of light of the specified wavelength, here, 633 nm. Max wedge is preferably 0.1 m rad, which is the angle between the two sides of the glass, and scratch/dig is preferably 60/40, defining the quality of the surfaces. A preferred angle of incidence for beams 99 and 100 is fifty (50) degrees to the surface of the first and second laser beamsplitters 30 and 32, with a refraction angle of beams 99 and 100 of 30.7°.

The first beamsplitter 30 first front coating 36 is preferably an aluminum coating, and the first back coating 38 is preferably a semitransparent beamsplitter layer coating. The first front coating 36 provides output beam 101 with 29%±3% of the inputted light intensity of beam 99. The first back coating 38 provides output beam 100 with 54%±6% of the inputted light intensity of beam 99. The second beamsplitter 32 second front coating 46 is preferably an aluminum coating, and the second back coating 48 is preferably a semitransparent beamsplitter layer coating. The second front coating 46 provides output beam 103 with 47%±5% of the inputted light intensity, which is beam 100, itself being 54%±6% of beam 99. The second back coating 48 provides output beam 102 with 47%±5% of the inputted light intensity, which is beam 100, itself being 54%±6% of beam 99. Accordingly, beam 99 entering the laser beamsplitter 12 of the present invention at 100% intensity will be outputted as beams 101, 102 and 103 at intensities of approximately 29%±3%, thereby providing three parallel output beams of substantially equal intensity.

A preferred thickness of the laser beamsplitters 30 and 32 is a thickness of approximately 6–8 mm such that the generated parallel beams are approximately 5 mm apart, since the separation of the output beams depends only upon the thickness of the beamsplitter 30 or 32, and the angle of incidence. The measurements are defined and selected so that beams 100 and 101 are closer to each other than beams 102 and 103, since an equilateral triangular relationship between the beams is desired. It is to be understood that simple geometric calculations will yield the precise measurements necessary to ensure an equilateral triangular relationship between the beams. A preferred distance between the first and second beamsplitters 30 and 32 is approximately 2 cm. The beamsplitter coatings are selected such that the three output beams have substantially the same intensity. The effect of the orientation of the polarization of the incoming laser beam must be taken into account in the selection of the front and back coatings 36, 38, 46, and 48, to achieve the desired equivalent intensity.

The three parallel output beams 101, 102, and 103 are all preferably equidistant from the original path of the initial beam 99. In other words, if the initial beam 99 were projected through the beamsplitters 30 and 32 along its original path, without being split, it would be positioned approximately in the center of the equilateral triangle defined by beams 101, 102, and 103.

While the above description contains many specificities, these should not be construed as limitations on the scope of the invention, but rather as an exemplification of preferred embodiments thereof. Many other variations are possible. For example, the first and second beamsplitters 30 and 32 are described as being tilted around horizontal and vertical axis. The first and second beamsplitter 30 and 32 could be positioned in varying degrees of rotation relative to each other, with various thicknesses and incident angles, yet still generate three parallel beams, although the resulting beams would be oriented in a different triangular configuration relative to each other. Such changes to the variables of the present embodiments are contemplated by the disclosure herein.

What is claimed is:

1. An interferometer comprising
   a laser reference source,
   a primary beamsplitter,
   a fixed mirror,
   a movable mirror,
   a system for detecting variations in alignment between said fixed mirror and said movable mirror including three detectors located adjacent to a laser beam output field and arranged at the vertices of a triangle,
   a laser beamsplitter,
   said laser beamsplitter comprising
      a first beamsplitter comprising an optical flat having a first partially coated face and a second partially coated face parallel to each other,
      a second beamsplitter comprising an optical flat having a third partially coated face and a fourth partially coated face parallel to each other,
      said first beamsplitter being positioned such that an incident beam entering said first beamsplitter is split into a first beam and a second beam parallel to each other, and
      said second beamsplitter being positioned relative to said first beamsplitter such that at least one of said first beam and said second beam enters said second beam splitter and is split into a third beam and a fourth beam parallel to each other and to said second beam.

2. The interferometer of claim 1 wherein said first partially coated face is coated with a beamsplitting coating and said second partially coated face is coated with a reflective coating.

3. The interferometer of claim 2 wherein said third partially coated face is coated with a beamsplitting coating and said fourth partially coated face is coated with a reflective coating.

4. The interferometer of claim 1 wherein said first beamsplitter and said second beamsplitter are positioned relative to each other and oriented such that at least one of said first and said second beams is positioned in a triangular relationship with said third beam and said fourth beam on an imaginary plane orthogonal to said incident beam.

5. The interferometer of claim 4 wherein said triangular relationship is that of an equilateral triangle such that each beam is equidistant from each other beam.

6. The interferometer of claim 1 wherein said reflective coating on said first face and said third face, and said beamsplitting coating on said second face and said fourth face, are selected such that at least one of said first and said second beams, said third beam, and said fourth beam, are all substantially equal to each other in intensity.

7. The interferometer of claim 1 wherein at least one of said first and said second beams, said third beam and said fourth beam are parallel to said incident beam.

8. The interferometer of claim 1 wherein said first beamsplitter is circular in shape and said second beamsplitter is rectangular in shape.

9. The interferometer of claim 1 wherein said incident beam enters said first beamsplitter at an angle of incidence of fifty degrees and at least said first beam or second beam enters said second beamsplitter at an angle of incidence of fifty degrees.

10. The interferometer of claim 1 wherein said incident beam has a wavelength of 633 nanometers.

11. The interferometer of claim 1 wherein said optical flat of said first beamsplitter and said second beamsplitter has a refractive index between 1.45 and 1.55.

12. The interferometer of claim 1 wherein a thickness of said first beamsplitter and said second beamsplitter is approximately 6 millimeters such that said first beam and said second beam are approximately 5 millimeters apart from each other, and such that said third beam and said fourth beam are approximately 5 millimeters apart from each other.

13. The interferometer of claim 1 wherein said second beamsplitter is positioned approximately 2 centimeters away from said first beamsplitter.

14. A spectrometer comprising
    an infrared light source,
    a laser reference source,
    a primary beamsplitter,
    a fixed mirror,
    a movable mirror,
    a system for detecting variations in alignment between said fixed mirror and said movable mirror including three detectors located adjacent to a laser beam output field and arranged at the vertices of a triangle,
    a laser beamsplitter,
    said laser beamsplitter comprising
       a first beamsplitter comprising an optical flat having a first partially coated face and a second partially coated face parallel to each other,
       a second beamsplitter comprising an optical flat having a third partially coated face and a fourth partially coated face parallel to each other,
       said first beamsplitter being positioned such that an incident beam entering said first beamsplitter is split into a first beam and a second beam parallel to each other, and
       said second beamsplitter being positioned relative to said first beamsplitter such that at least one of said first beam and said second beam enters said second beamsplitter and is split into a third beam and a fourth beam parallel to each other and to said second beam.

15. The spectrometer of claim 14 wherein said first partially coated face is coated with a beamsplitting coating and said second partially coated face is coated with a reflective coating.

16. The spectrometer of claim 15 wherein said third partially coated face is coated with a beamsplitting coating and said fourth partially coated face is coated with a reflective coating.

17. The spectrometer of claim 14 wherein said first beamsplitter and said second beamsplitter are positioned relative to each other and oriented such that at least one of said first and said second beams is positioned in a triangular relationship with said third beam and said fourth beam on an imaginary plane orthogonal to said incident beam.

18. The spectrometer of claim 17 wherein said triangular relationship is that of an equilateral triangle such that each beam is equidistant from each other beam.

19. The spectrometer of claim 14 wherein said reflective coating on said first face and said third face, and said beamsplitting coating on said second face and said fourth face, are selected such that at least one of said first and said second beams, said third beam, and said fourth beam, are all substantially equal to each other in intensity.

20. The spectrometer of claim 14 wherein at least one of said first and said second beams, said third beam and said fourth beam are parallel to said incident beam.

21. The spectrometer of claim 14 wherein said first beamsplitter is circular in shape and said second beamsplitter is rectangular in shape.

22. The spectrometer of claim 14 wherein said incident beam enters said first beamsplitter at an angle of incidence of fifty degrees and at least said first beam or second beam enters said second beamsplitter at an angle of incidence of fifty degrees.

23. The spectrometer of claim 14 wherein said incident beam has a wavelength of 633 nanometers.

24. The spectrometer of claim 14 wherein said optical flat of said first beamsplitter and said second beamsplitter has a refractive index between 1.45 and 1.55.

25. The spectrometer of claim 14 wherein a thickness of said first beamsplitter and said second beamsplitter is approximately 6 millimeters such that said first beam and said second beam are approximately 5 millimeters apart from each other, and such that said third beam and said fourth beam are approximately 5 millimeters apart from each other.

26. The spectrometer of claim 14 wherein said second beamsplitter is positioned approximately 2 centimeters away from said first beamsplitter.

27. An interferometer comprising
 a laser reference source,
 a primary beamsplitter,
 a fixed mirror,
 a movable mirror,
 a system for detecting variations in alignment between said fixed mirror and said movable mirror including three detectors located adjacent to a laser beam output field and arranged at the vertices of a triangle,
 a laser beamsplitter for splitting an incident beam into at least three parallel beams comprising
  a first beamsplitter comprising
   an optical flat having a first face and a second face parallel to each other,
   a first portion of said first face coated with a reflective coating and a second portion of said first face not coated with said reflective coating, said first face positioned such that an incident beam enters said first beamsplitter through said second portion of said first face,
   a first portion of said second face coated with a beamsplitting coating and a second portion of said second face not coated with said beamsplitting coating, said second face positioned such that said incident beam is partially transmitted through said first portion of said second face and out of said first beamsplitter as said first beam, and partially reflected back toward said first portion of said first face and then reflected by said first portion of said first face out of said first beamsplitter through said second portion of said second face as said second beam parallel to said first beam,
  a second beamsplitter comprising
   an optical flat having a third face and a fourth face parallel to each other,
   a first portion of said third face coated with a reflective coating and a second portion of said third face not coated with said reflective coating, said third face positioned such that at least one of said first beam and said second beam enters said second beamsplitter through said second portion of said third face,
   a first portion of said fourth face coated with a beamsplitting coating and a second portion of said fourth face not coated with said beamsplitting coating, said fourth face positioned such that the beam entering said second beamsplitter is partially transmitted through said first portion of said fourth face and out of said second beamsplitter as a third beam, and partially reflected back toward said first portion of said third face and then reflected by said first portion of said third face out of said first beamsplitter through said second portion of said second face as said fourth beam, and
  said first beamsplitter and said second beamsplitter positioned relative to each other and oriented such that at least one of said first and said second beams is positioned in a triangular relationship with said third beam and said fourth beam on an imaginary plane orthogonal to said incident beam.

28. The interferometer of claim 27 wherein said first partially coated face is coated with a beamsplitting coating and said second partially coated face is coated with a reflective coating.

29. The interferometer of claim 28 wherein said third partially coated face is coated with a beamsplitting coating and said fourth partially coated face is coated with a reflective coating.

30. The interferometer of claim 27 wherein said first beamsplitter and said second beamsplitter are positioned relative to each other and oriented such that at least one of said first and said second beams is positioned in a triangular relationship with said third beam and said fourth beam on an imaginary plane orthogonal to said incident beam.

31. The interferometer of claim 30 wherein said triangular relationship is that of an equilateral triangle such that each beam is equidistant from each other beam.

32. The interferometer of claim 27 wherein said reflective coating on said first face and said third face, and said beamsplitting coating on said second face and said fourth face, are selected such that at least one of said first and said second beams, said third beam, and said fourth beam, are all substantially equal to each other in intensity.

33. The interferometer of claim 27 wherein at least one of said first and said second beams, said third beam and said fourth beam are parallel to said incident beam.

34. The interferometer of claim 27 wherein said first beamsplitter is circular in shape and said second beamsplitter is rectangular in shape.

35. The interferometer of claim 27 wherein said incident beam enters said first beamsplitter at an angle of incidence of fifty degrees and at least said first beam or second beam enters said second beamsplitter at an angle of incidence of fifty degrees.

36. The interferometer of claim 27 wherein said incident beam has a wavelength of 633 nanometers.

37. The interferometer of claim 27 wherein said optical flat of said first beamsplitter and said second beamsplitter has a refractive index between 1.45 and 1.55.

38. The interferometer of claim 27 wherein a thickness of said first beamsplitter and said second beamsplitter is approximately 6 millimeters such that said first beam and said second beam are approximately 5 millimeters apart from each other, and such that said third beam and said fourth beam are approximately 5 millimeters apart from each other.

39. The interferometer of claim 27 wherein said second beamsplitter is positioned approximately 2 centimeters away from said first beamsplitter.

40. A spectrometer comprising an infrared light source, a laser reference source, a primary beamsplitter, a fixed mirror, a movable mirror, a system for detecting variations in alignment between said fixed mirror and said movable mirror including three detectors located adjacent to a laser beam output field and arranged at the vertices of a triangle, a laser beamsplitter for splitting an incident beam into at least three parallel beams comprising a first beamsplitter comprising an optical flat having a first face and a second face parallel to each other, a first portion of said first face coated with a reflective coating and a second portion of said first face not coated with said reflective coating, said first face positioned such that an incident beam enters said first beamsplitter through said second portion of said first face, a first portion of said second face coated with a beamsplitting coating and a second portion of said second face not coated with said beamsplitting coating, said second face positioned such that said incident beam is partially transmitted through said first portion of said second face and out of said first beamsplitter as said first beam, and partially reflected back toward said first portion of said first face and then reflected by said first portion of said first face out of said first beamsplitter through said second portion of said second face as said second beam parallel to said first beam, a second beamsplitter comprising an optical flat having a third face and a fourth face parallel to each other, a first portion of said third face coated with a reflective coating and a second portion of said third face not coated with said reflective coating, said third face positioned such that at least one of said first beam and said second beam enters said second beamsplitter through said second portion of said third face, a first portion of said fourth face coated with a beamsplitting coating and a second portion of said fourth face not coated with said beamsplitting coating, said fourth face positioned such that the beam entering said second beamsplitter is partially transmitted through said first portion of said fourth face and out of said beamsplitter as a third beam, and partially reflected back toward said first portion of said third face and then reflected by said first portion of said third face out of said first beamsplitter through said second portion of said second face as said fourth beam, and said first beamsplitter and said second beamsplitter positioned relative to each other and oriented such that at least one of said first and said second beams is positioned in a triangular relationship with said third beam and said fourth beam on an imaginary plane orthogonal to said incident beam.

41. The spectrometer of claim 40 wherein said first partially coated face is coated with a beamsplitting coating and said second partially coated face is coated with a reflective coating.

42. The spectrometer of claim 41 wherein said third partially coated face is coated with a beamsplitting coating and said fourth partially coated face is coated with a reflective coating.

43. The spectrometer of claim 40 wherein said first beamsplitter and said second beamsplitter are positioned relative to each other and oriented such that at least one of said first and said second beams is positioned in a triangular relationship with said third beam and said fourth beam on an imaginary plane orthogonal to said incident beam.

44. The spectrometer of claim 43 wherein said triangular relationship is that of an equilateral triangle such that each beam is equidistant from each other beam.

45. The spectrometer of claim 40 wherein said reflective coating on said first face and said third face, and said beam splitting coating on said second face and said fourth face, are selected such that at least one of said first and said second beams, said third beam, and said fourth beam, are all substantially equal to each other in intensity.

46. The spectrometer of claim 40 wherein at least one of said first and said second beams, said third beam and said fourth beam are parallel to said incident beam.

47. The spectrometer of claim 40 wherein said first beamsplitter is circular in shape and said second beamsplitter is rectangular in shape.

48. The spectrometer of claim 40 whereto said incident beam enters said first beamsplitter at an angle of incidence of fifty degrees and at least said first beam or second beam enters said second beamsplitter at an angle of incidence of fifty degrees.

49. The spectrometer of claim 40 wherein said incident beam has a wavelength of 633 nanometers.

50. The spectrometer of claim 40 wherein said optical flat of said first beamsplitter and said second beamsplitter has a refractive index between 1.45 and 1.55.

51. The spectrometer of claim 40 wherein a thickness of said first beamsplitter and said second beamsplitter is approximately 6 millimeters such that said first beam and said second beam are approximately 5 millimeters apart from each other, and such that said third beam and said fourth beam are approximately 5 millimeters apart from each other.

* * * * *